Oct. 23, 1923.
J. J. HASKIN
1,471,730
GEAR SHIFT MECHANISM
Filed April 26, 1921
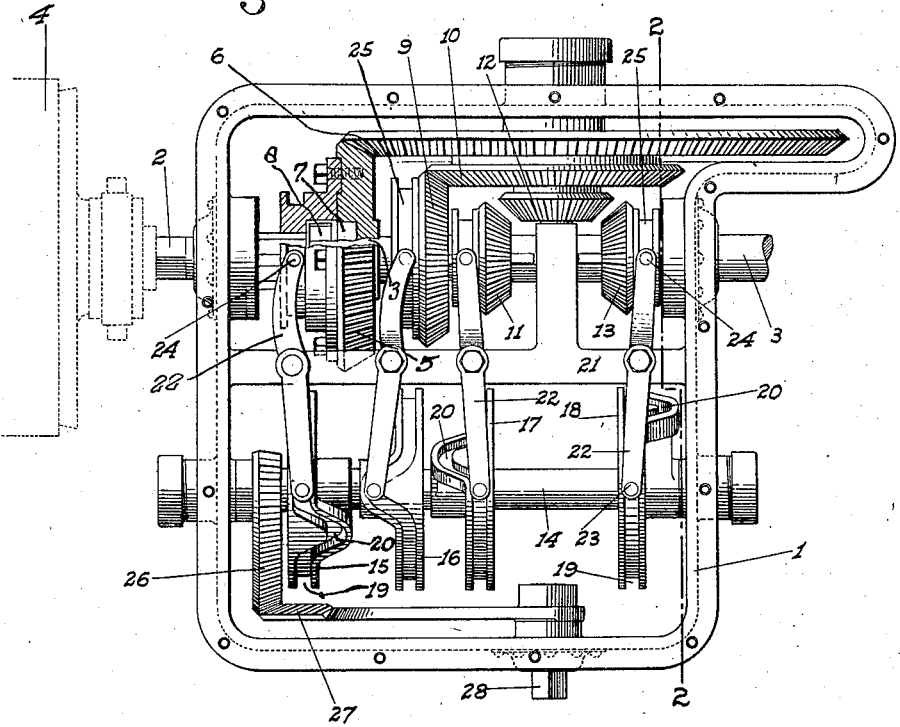
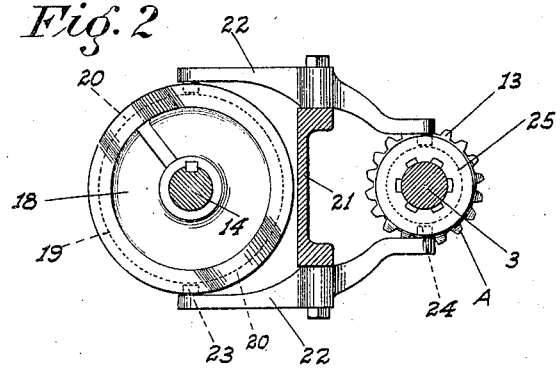
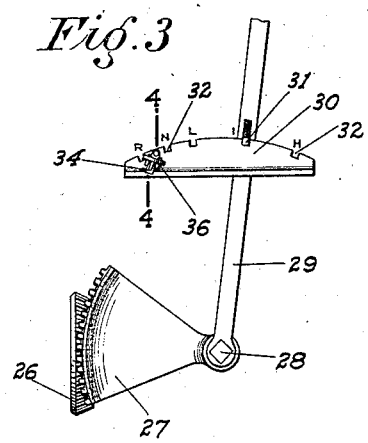
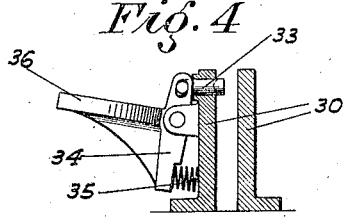
INVENTOR.
J. J. Haskin
BY
ATTORNEY Patented Oct. 23, 1923.

1,471,730

UNITED STATES PATENT OFFICE.

JOSEPH J. HASKIN, OF STOCKTON, CALIFORNIA.

GEAR-SHIFT MECHANISM.

Application filed April 26, 1921. Serial No. 464,623.

*To all whom it may concern:*

Be it known that I, JOSEPH J. HASKIN, a citizen of the United States, residing at Stockton, county of San Joaquin, State of California, have invented certain new and useful Improvements in Gear-Shift Mechanism; and I do declare the following to be a full, clear, and exact description of the same, reference being had to the accompanying drawings, and to the characters of reference marked thereon, which form a part of this application.

This invention relates to improvements in gear shift mechanisms such as are universally employed with internal combustion engine driven vehicles.

The principal object of my invention is to provide a gear shift in which the various movable gears will mesh with their respective fixed gears by a movement of the face of one directly toward the face of the other, in distinction from the ordinary type where the gear teeth are slid into mesh with each other end-on.

This feature will reduce gear-stripping to a minimum, since with my type of shift any tooth meshes with another throughout its whole length of face at once, giving far greater strength than when the gears first mesh only at their ends.

Another object of the invention is to so arrange the gears that the shifting is accomplished by a straight fore and aft movement of the shift lever, rendering the shifting much simpler than when the lever has to be moved transversely at a certain point in its fore and aft movement, as is the case with the usual gear shift levers now in use.

A third object is to provide a simple means for making it impossible to accidentally throw the lever to reverse, this operation being also a common cause in gear stripping and breaking of the gears and other parts.

A further object of the invention is to produce a simple and inexpensive device and yet one which will be exceedingly effective for the purposes which it is designed.

These objects I accomplish by means of such structure and relative arrangement of parts as will fully appear by a perusal of the following specification and claims.

In the drawings similar characters of reference indicate corresponding parts in the several views.

Fig. 1 is a top plan view of the gear mechanism.

Fig. 2 is a detached cross section on a line 2—2 of Fig. 1.

Fig. 3 is a detached side elevation of the shift lever and its co-operating members.

Fig. 4 is an enlarged section on a line 4—4 of Fig. 3.

Referring now more particularly to the characters of reference on the drawings, the numeral 1 denotes a suitably formed casing, arranged as is customary to receive a removable cover (not shown). Journaled in the casing in continuous alinement with the engine shaft is a drive shaft 2, while the driven shaft 3, also journaled in the casing and projecting from the opposite end of the casing, may be considered as an extension of the drive shaft, being in continuous alinement therewith although independent thereof.

The drive shaft 2 has the usual clutch 4 interposed between the same and the engine shaft.

Slidably splined on to the shaft 2 inside the casing is a bevel gear 5 adapted to mesh with a bevel gear 6 journaled in the casing at right angles to said shafts.

The gear is adapted to be moved away from the shaft 3, and has on the end adjacent thereto clutch means 7 adapted to engage a companion clutch member 8 on the end of the shaft 3, when said gear 5 is moved away from the gear 6. As shown in Fig. 1, the shaft 3 projects inwardly of the gear 5 being turnable therein, and held against longitudinal movement.

Slidably splined on the shaft 3 is a bevel gear 9 adapted to mesh with a bevel gear 10 mounted in connection and concentric with the gear 6. This gear 9 is of course adapted to be disengaged from the gear 10 by a movement toward the clutch end of the shaft.

Similarly mounted on the shaft 3 beyond the gear 9 is another bevel gear 11 adapted to mesh with a gear 12 also mounted in connection with the gear 6. Similarly mounted on the shaft 3 in opposed relation to the gear 11 and adapted to mesh with the gear 12 at a point opposite to the engagement therewith of the gear 11 is a bevel gear 13.

It is to be understood that the gears 5, 9, 11 and 6, 10 and 12 are of varying sizes to give various speeds, while the gears 11 and 13 are the same size, as they mesh with a common gear.

Suitable manipulation of these gears will then impart a speed to the driven shaft from the drive shaft in definite and distinct ratios.

Meshing of the gears 5 and 6 imparts rotation to the idler gears 6, 10 and 12.

Meshing of the gears 9 and 12 will give what is commonly known as intermediate speed, the meshing of gears 12 and 13 will give low speed, while the meshing of gears 12 and 13 will of course reverse the movement of the shaft 3 relative to the shaft 2.

For running in "high gear" the gear 5 is disengaged from the gear 6 and caused to connect with the shaft 3 by means of the clutch 7—8, when the shafts 2 and 3 will travel in common. For a neutral position the gear 5 is held in mesh with the gear 6, while the driven-shaft gears are held unmeshed from their respective idlers.

To enable the gears to be shifted in proper sequence to accomplish the above results, I provide the following mechanism:—Journaled in the casing parallel to the shafts 2 and 3 is another shaft 14, which has fixed thereon a number of barrel or drum cams 15, 16, 17 and 18, there being one such cam for each slidable gear used.

Each cam has a straight peripheral groove 19 for the greater portion of its length, with a pair of diametrically opposed offset or cam grooves 20 at a predetermined location.

Pivoted intermediate their ends on a cross-bar web 21 in the casing are levers or arms 22, one set for each cam member, since each cam has a pair of such levers mounted in opposed vertical alinement and forming a sort of double ended yoke.

One end of each pair carries pins or rollers 23 riding in the grooves 19 at opposed points, while the opposite ends carry similar pins or rollers 24 adapted to ride in the grooves of collars 25 with which each of the sliding gears is provided.

The cam grooves 20 are so designed that the levers may have a swing or throw sufficient to move the sliding gears in or out of mesh with their respective idlers.

The cam groove 20 then in the cam 15 enables the gear 5 to move from contact with the gear 6 into contact with the clutch member 8. When the yoke-pins are in the straight groove of the cam 15, the gear 5 is meshed with the gear 6. When the yoke-pins of the other yokes are travelling in the straight grooves of their respectve cams, the respective gears connected thereto are unmeshed from their idler gears.

The cams are mounted on the shaft so that each offset groove is positioned differently with respect to a radial line from the adjacent one and from each other. These positions may be varied to suit. For instance, in the accompanying drawing, and presupposing a rotation of the shaft 14 in a counter-clockwise direction, the sequence of the meshing of the various gears in terms of the results obtained is as follows: High, intermediate, low, neutral and reverse. Any other arrangement however may be made, as long as no two conflict.

The cam grooves 20 are also so positioned relative to each other that the various shifts will follow each other in rapid sequence, thus lessening the amount the shaft 14 must be rotated to carry out all the movements outlined.

To rotate the shaft 14, I provide a segmental or mutilated bevel gear 26 fixed on the shaft 14, and meshing with a similar gear 27 journaled in the casing and preferably at right angles with each other.

The shaft 28 of the gear 27 projects through the casing and has connected thereto a lever 29 which projects upwards a suitable distance, this being the lever handled directly by the driver of the car.

A quadrant 30 is provided in connection with said lever, the latter having a pawl 31 adapted to engage with notches 32 in the quadrant, which are positioned to correspond to the different meshings of the several co-related gears in the casing, as hereinbefore described.

Slidably mounted in the quadrant transversely thereof and just ahead of the notch which indicates the reverse-drive position of the lever is a pin 33, connected to a rocker arm 34 pivoted on the outside of the quadrant. This pin is normally held in the path of movement of the lever by reason of a spring 35 connected to the rocker arm, and may be withdrawn therefrom at the will of the driver by means of a footpad 36 projecting from and attached to the rocker arm, this pad being so positioned that on being depressed by the foot, the rocker arm will be turned about its pivotal connection to withdraw the pin away from the path of the lever, permitting the latter to be then moved to register with the "reverse" notch. The pin is preferably wedge-shaped like an ordinary door catch, so that the lever may be moved away from the reverse notch without the necessity of the pad 36 being again manually depressed. This simple mechanism however, as will be evident, effectually prevents the lever from being accidentally moved to reverse position.

The gears 26 and 27 are so proportioned relative to each other that a relatively small arcuate movement of the lever will be sufficient to rotate the shaft 14 the necessary amount.

The top edges of the teeth of the actual shift gears 5, 6, etc., are preferably beveled away from a true circular plane, as shown at "A" in Fig. 2, such bevel facing in the direction dependent upon their direction of rotation which will cause and enable the gears to mesh very easily.

I have here shown and described a mechanism to give three speeds forward and one reverse.

It will be evident however that by merely adding on the necessary members, any number of speeds can be obtained, so that I do not limit myself to the particular number shown.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a gear shift mechanism having drive and driven shafts and a plurality of gears arranged to be enmeshed to transmit power from the drive to the driven shafts with various speed ratios in the same direction or to reverse the direction of rotation of one shaft relative to the other, a hand lever for shifting said gears, a notched quadrant for said lever to indicate the various gear-shiftings controlled by the movement of said lever, a pin arranged to project across the path of movement of the lever ahead of the reverse-position notch, and a foot pad connected to said pin and arranged to be depressed to withdraw said pin from the path of the lever at will.

2. A gear shift mechanism comprising a drive shaft, a driven shaft in continuous alinement therewith, a bevel gear splined on the drive shaft, an idler bevel gear with which said first named gear is adapted to mesh, a plurality of independently splined bevel gears of different sizes on the driven shaft, idler bevel gears mounted in connection with said first named bevel gears, there being one such gear for each driven-shaft gear, another bevel gear oppositely disposed to one of said driven shaft gears and adapted to mesh with the corresponding idler gear thereof, and hand actuated means for moving any pair of corresponding gears into operative engagement.

3. A gear shift mechanism including alined drive and driven shafts, a plurality of different sized idler bevel gears mounted in common for rotation in unison about an axis at an angle to the said shafts, bevel gears splined on the driven shaft adapted to be selectively engaged with the corresponding idler gears, and means for driving said idler gears from the drive shaft independently of said splined gears.

4. A gear shift mechanism including alined drive and driven shafts, a plurality of different sized idler bevel gears mounted in common for rotation in unison about an axis at an angle to the said shafts, bevel gears splined on the driven shaft adapted to be selectively engaged with the corresponding idler gears, and a bevel gear on the drive shaft adapted to be selectively enmeshed with a certain one of said idler gears independently of said splined gears.

5. A gear shift mechanism including alined drive and driven shafts, a plurality of different sized idler bevel gears mounted in common for rotation in unison about an axis at an angle to the said shafts, bevel gears splined on the driven shaft adapted to be selectively engaged with the corresponding idler gears, a bevel gear on the drive shaft adapted to be moved into and out of engagement with a certain one of said idler gears, a clutch member on said bevel gear, and a companion clutch member on the driven shaft adapted to be engaged by the first named clutch member when the driven shaft gear is moved out of engagement with the idler gear, said driven shaft projecting into said driven shaft gear and being normally turnable therein.

6. A gear shift mechanism including alined drive and driven shafts, a plurality of different sized idler bevel gears mounted in common for rotation n unison about an axis at an angle to the said shafts, said gears being of successively smaller diameter as they approach the shafts, correspondingly sized bevel gears splined on said shafts and adapted to be selectively engaged with corresponding ones of the idler gears, two of said splined gears on the driven shaft being adapted to engage one of said idler gears at oposite points thereon and at alternate times.

7. A gear shift mechanism including alined drive and driven shafts, a plurality of different sized idler bevel gears mounted in common for rotation in unison about an axis at an angle to said shafts, bevel gears splined on the driven shaft and adapted to be selectively engaged with the corresponding idler gears, a bevel gear on the drive shaft adapted to be moved into and out of engagement with a certain one of said idler gears, and means whereby when said drive shaft gear is moved out of said engagement the drive and driven shafts will be connected together.

8. A gear shift mechanism including alined drive and driven shafts, a plurality of different sized idler beveled gears mounted in common for rotation in unison about an axis at an angle to said shafts, bevel gears splined on the driven shaft and adapted to be selectively engaged with the corresponding idler gears, a bevel gear on the drive shaft adapted to be moved into and out of engagement with a certain one of said idler gears, clutch jaws projecting outwardly from the driven shaft adjacent the drive shaft, said drive shaft gear overhanging said jaws, and co-operating jaws on said gear positioned to engage the driven shaft jaws only when the gear is moved out of engagement with its bevel gear.

In testimony whereof I affix my signature.

JOSEPH (J.) HASKIN.